US012024391B2

(12) United States Patent
Tanaka et al.

(10) Patent No.: US 12,024,391 B2
(45) Date of Patent: Jul. 2, 2024

(54) SHEET PROCESSING APPARATUS

(71) Applicant: DUPLO SEIKO CORPORATION, Kinokawa (JP)

(72) Inventors: Yasuhiro Tanaka, Kinokawa (JP); Haruka Takemoto, Kinokawa (JP)

(73) Assignee: DUPLO SEIKO CORPORATION, Kinokawa (JP)

( * ) Notice: Subject to any disclaimer, the term of this patent is extended or adjusted under 35 U.S.C. 154(b) by 240 days.

(21) Appl. No.: 17/410,270

(22) Filed: Aug. 24, 2021

(65) Prior Publication Data

US 2022/0063950 A1 Mar. 3, 2022

(30) Foreign Application Priority Data

Aug. 26, 2020 (JP) ................................ 2020-142470

(51) Int. Cl.

*B65H 35/00* (2006.01)
*B26D 5/26* (2006.01)
(Continued)

(52) U.S. Cl.

CPC ........... *B65H 35/0086* (2013.01); *B26D 5/26* (2013.01); *B65H 5/062* (2013.01); *B65H 35/04* (2013.01);
(Continued)

(58) Field of Classification Search

CPC . B65H 5/06; B65H 5/062; B65H 5/20; B65H 5/26; B65H 5/28; B65H 35/0073;
(Continued)

(56) References Cited

U.S. PATENT DOCUMENTS 5,790,168 A * 8/1998 Sano ...................... B65H 35/02 347/262
11,173,732 B2 * 11/2021 Suzuki ..................... B41J 11/68
(Continued)

FOREIGN PATENT DOCUMENTS

CN 110228090 A 9/2019
EP 0 795 382 A2 9/1997
(Continued)

OTHER PUBLICATIONS

Extended European Search Report issued in corresponding European Patent Application No. 21 19 2847, dated Jan. 25, 2022 (9 pages).

*Primary Examiner* — Richard D Crosby, Jr.
(74) *Attorney, Agent, or Firm* — BUCHANAN INGERSOLL & ROONEY PC

(57) ABSTRACT

A sheet processing apparatus includes a conveyance unit that conveys a sheet, a processing unit that performs processing on the sheet conveyed by the conveyance unit, and a controller that controls the conveyance unit and the processing unit. The processing unit includes a cutting unit capable of cutting the sheet along a cutting line, a holding unit that is configured to be movable between a holding position and a release position and that is disposed such that a holding line, which is formed on the sheet when the sheet is held, is substantially parallel to the cutting line, and an angle adjuster capable of adjusting an angle of the cutting unit and the holding unit with respect to a conveying direction.

8 Claims, 9 Drawing Sheets

(51) Int. Cl.
*B65H 5/06* (2006.01)
*B65H 35/04* (2006.01)
*B65H 43/00* (2006.01)

(52) U.S. Cl.
CPC ....... *B65H 43/00* (2013.01); *B65H 2301/341* (2013.01)

(58) Field of Classification Search
CPC .. B65H 35/008; B65H 35/0086; B65H 35/04; B65H 43/00; B65H 2301/341
See application file for complete search history.

(56) References Cited

U.S. PATENT DOCUMENTS

| | | | | |
|---|---|---|---|---|
| 2006/0098071 A1* | 5/2006 | Tanabe | B41J 11/68 | 347/101 |
| 2009/0226236 A1* | 9/2009 | Yamashita | B41J 11/706 | 400/621 |
| 2010/0150632 A1* | 6/2010 | Matsumoto | B41J 2/2146 | 399/395 |
| 2011/0048266 A1* | 3/2011 | Crystal | B41J 3/4073 | 101/483 |
| 2013/0271545 A1* | 10/2013 | Nagashima | B41J 11/70 | 347/104 |
| 2015/0174781 A1* | 6/2015 | Baba | B26D 7/025 | 83/452 |
| 2016/0121502 A1* | 5/2016 | Carey | B26D 5/14 | 101/24 |

FOREIGN PATENT DOCUMENTS

| | | | | |
|---|---|---|---|---|
| JP | H7164380 | A | | 6/1995 |
| JP | 3879819 | B2 | | 2/2007 |
| JP | 2014088263 | A | * | 5/2014 |
| JP | 2014088263 | A | | 5/2014 |

* cited by examiner

SHEET PROCESSING APPARATUS

BACKGROUND OF THE INVENTION

Field of the Invention

The present invention relates to a sheet processing apparatus.

Description of the Related Art

Patent Document 1 discloses a cutter apparatus including a pressing unit that holds under pressure the recording medium between the pressing unit and the cutter blade over a width direction by raising the recording medium from a conveyance position where the recording medium is not cut to press the recording medium against a lower surface of a shear plate near an upstream side of a cutter blade when a recording medium is cut.

PRIOR ART DOCUMENT

Patent Document

Patent Document 1: JP 3879819 B2

SUMMARY OF THE INVENTION

In the cutter apparatus, the cutter blade is not configured to be movable in a direction other than the width direction of the recording medium. Thus, when the recording medium is tilted with respect to a conveyance direction, the recording medium may not be precisely cut.

An object of the present invention is to provide a sheet processing apparatus capable of precisely cutting even a sheet tilted with respect to a conveyance direction.

A sheet processing apparatus according to an aspect of the present invention includes:

a conveyance unit that conveys a sheet along a first direction;

a processing unit that performs processing on the sheet conveyed by the conveyance unit; and a controller that controls the conveyance unit and the processing unit, in which the processing unit includes:

a cutting unit capable of cutting the sheet along a cutting line extending in a second direction intersecting with the first direction;

a holding unit that is configured to be movable between a holding position at which the sheet is held by being sandwiched in a thickness direction of the sheet and a release position at which holding of the sheet is released, and that is disposed such that a holding line, which is formed on the sheet when the sheet is held, is substantially parallel to the cutting line; and an angle adjuster capable of adjusting an angle of the cutting unit and the holding unit with respect to the first direction.

According to the sheet processing apparatus of the aspect, the processing unit includes the angle adjuster capable of adjusting the angle of the cutting unit and the holding unit with respect to the first direction. With such a configuration, a sheet processing apparatus capable of precisely cutting even a sheet tilted with respect to a conveyance direction can be realized.

DESCRIPTION OF THE PREFERRED EMBODIMENTS

Hereinafter, an example of the present disclosure will be described with reference to the accompanying drawings. Note that in the following description, terms indicating particular directions or positions (terms including, for example, "upper", "lower", "right", "left", "front", and "rear") are used as necessary, but the use of these terms is to facilitate understanding of the present disclosure with reference to the drawings, and the technical scope of the present disclosure is not limited by the meanings of these terms. In addition, the following description is merely exemplary in nature, and is not intended to limit the present disclosure, its application, or its use. Furthermore, the drawings are schematic, and ratios of dimensions and the like do not necessarily match actual ones.

Figure 1:
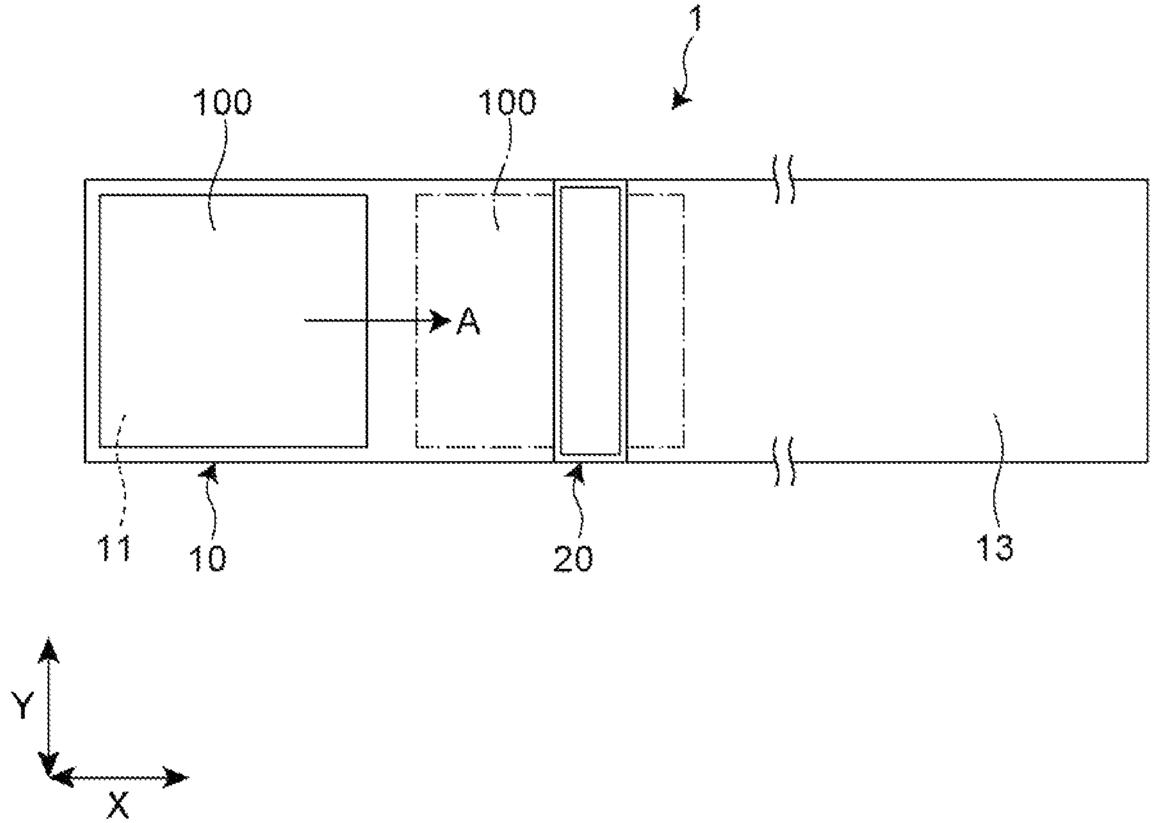
FIG. 1 is a schematic plan view illustrating a sheet processing apparatus according to an embodiment of the present invention.
Figure 6:
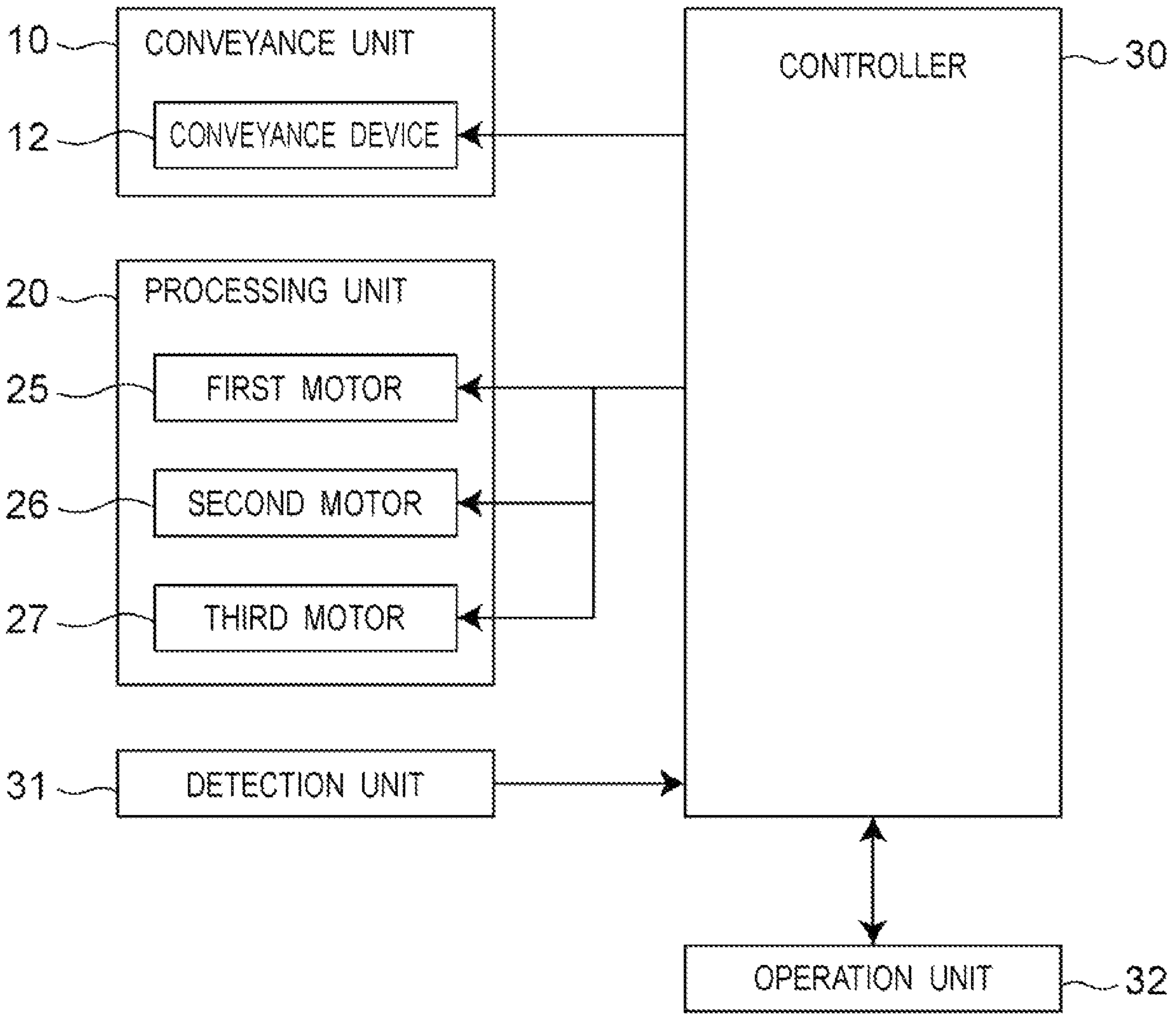
FIG. 6 is a block diagram of the sheet processing apparatus of FIG. 1.

As shown in FIG. 1, a sheet processing apparatus 1 according to an embodiment of the present invention includes a conveyance unit 10, a processing unit 20, and a controller 30 (see FIG. 6).

The conveyance unit 10 conveys a sheet 100 along a first direction (e.g., an X direction). As shown in FIG. 1, the conveyance unit 10 includes, for example, a sheet feed table 11 on which the sheet 100 is placed, a conveyance device 12 (see FIG. 6) that conveys the sheet 100 placed on the sheet feed table 11, and a discharge tray 13 to which the sheet 100 is discharged. The conveyance device 12 includes an arbitrary configuration capable of conveying the sheet 100 from the sheet feed table 11 to the discharge tray 13.

Figure 2:
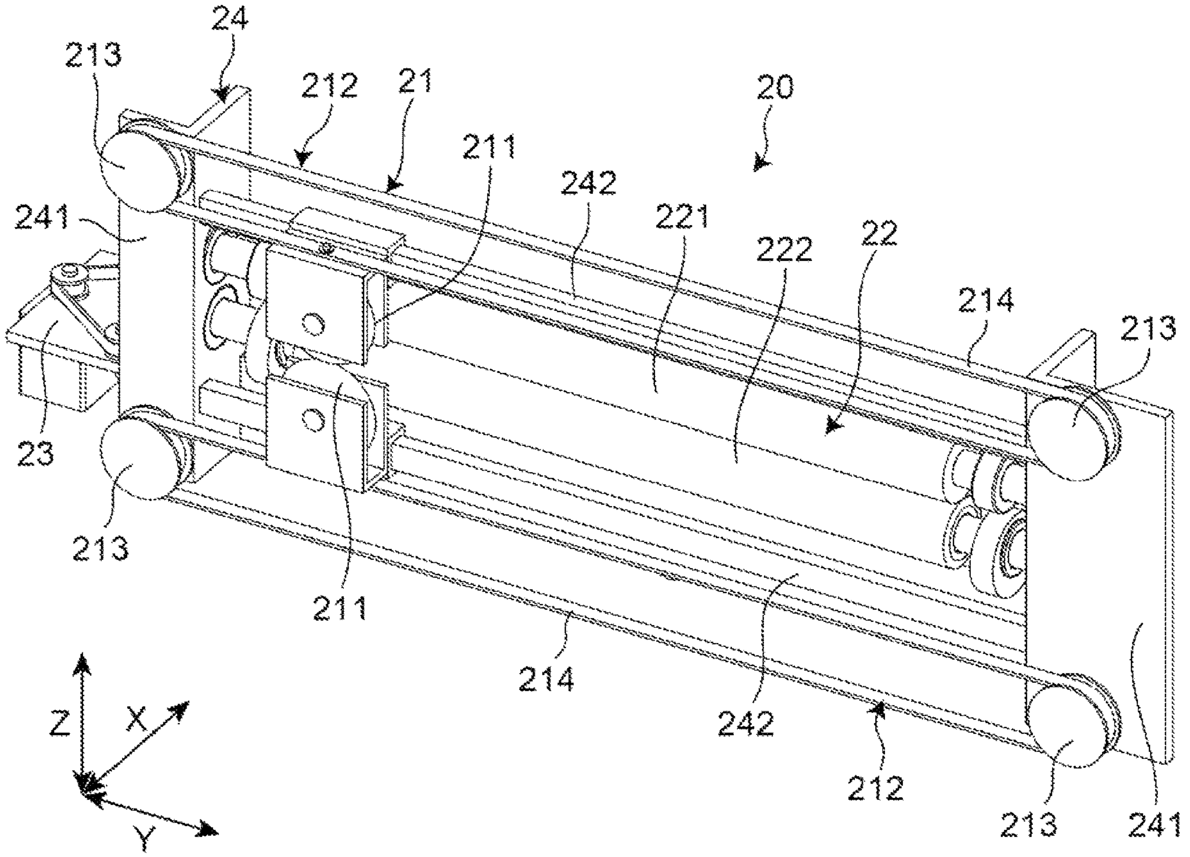
FIG. 2 is a perspective view illustrating a processing unit of the sheet processing apparatus of FIG. 1.

As shown in FIG. 2, the processing unit 20 includes a cutting unit 21, a holding unit 22, and an angle adjuster 23. The processing unit 20 performs processing including cutting on the sheet 100 conveyed by the conveyance unit 10. In the present embodiment, the processing unit 20 includes a support frame 24 that supports the cutting unit 21 and the holding unit 22 and is connected to the angle adjuster 23. The support frame 24 includes a pair of support wall portions 241 disposed at an interval in a second direction (e.g., a Y direction) intersecting with the first direction X, and a pair of rail members 242 each extending in the second direction Y to have both ends connected to the pair of support wall portions 241. The rail members 242 are disposed at an interval in a third direction (e.g., a Z direction) intersecting with the first direction X and the second direction Y.

The cutting unit 21 is disposed, for example, near the holding unit 22 and on a downstream side of the sheet 100 in a conveyance direction (an arrow A direction of FIG. 1). The cutting unit 21 is configured to be capable of cutting the sheet 100 along a cutting line L2 (see FIG. 4) extending in the second direction Y. In the present embodiment, as shown in FIG. 2, the cutting unit 21 includes a pair of cutting blades 211 movable in the second direction Y, and a pair of moving devices 212 each of which moves the cutting blade 211 in the second direction Y. For Example, each cutting blade 211 can be configured by a round blade, a fixed blade, and a movable blade. The pair of cutting blades 211 may be a combination of round blades, a combination of a round blade and a fixed blade, or a combination of a fixed blade and a movable blade. In addition, the movable blade may be a guillotine type. In this case, a moving device that moves the cutting blade in the second direction Y becomes unnecessary.

In the present embodiment, the moving devices 212 are disposed at an interval in the third direction Z. Each of the moving devices 212 includes a pair of pulleys 213, a belt member 214 wound around the pair of pulleys 213, and a first motor 25 (see FIG. 6) that rotates one of the pair of pulleys 213. Each of the pulleys 213 has a substantially cylindrical shape and is rotatably attached to each of the support wall portions. A pulley (not shown) is attached to a drive shaft of the first motor 25. A belt member (not shown) is wound around one of the pulleys 213 in the moving device 212 on the upper side, one of the pulleys 213 in the moving device 212 on the lower side, and the pulley attached to the drive shaft of the first motor 25. When driving the first motor 25, one of the pulleys 213 in each moving device 212 rotates via the belt member, and the belt member 214 rotates around the pair of pulleys 213. The cutting blades 211 have a substantially cylindrical shape and are disposed between the pair of moving devices 212 in a state of being slightly shifted from each other in the first direction X. Each cutting blade 211 is movably supported by the rail member 242 of the support frame 24 in the second direction Y, and is connected to the belt member 214 of the moving device 212. That is, each cutting blade 211 is configured to move in the second direction Y between the pair of support wall portions 241 by the rotation of the belt member 214.

The holding unit 22 is configured to be movable between a holding position P1 (see FIG. 4) at which the sheet 100 is held by being sandwiched in a thickness direction of the sheet (in other words, the third direction Z) and a release position P2 (see FIG. 5) at which holding of the sheet 100 is released. In the present embodiment, as shown in FIG. 2, the holding unit 22 includes a pair of rollers 221, 222 extending in the second direction Y, and a second motor 26 (see FIG. 6) as an example of a drive device that rotates one or both of the pair of rollers 221, 222. The rollers 221, 222 are disposed side by side in the third direction Z, and are supported by the pair of support wall portions 241 so as to be each rotatable forward and backward about a central axis CL1 (see FIG. 3) extending in the second direction Y.

Figure 4:
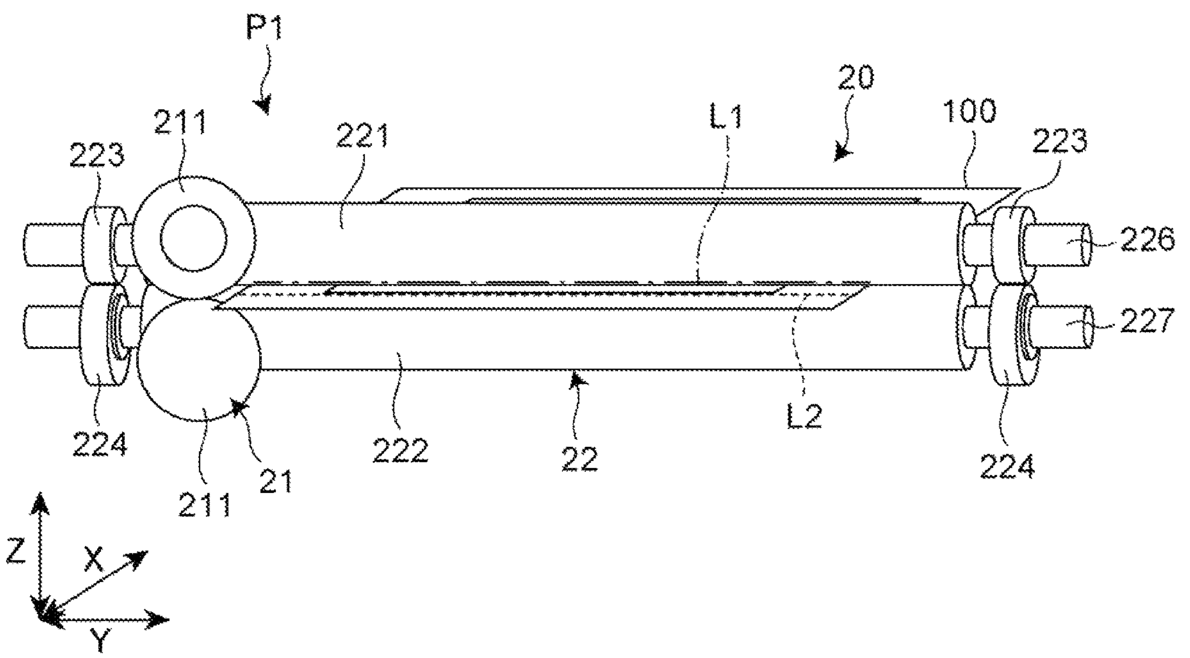
FIG. 4 is a schematic perspective view illustrating the processing unit at a holding position of the sheet processing apparatus of FIG. 1.

As shown in FIG. 4, the rollers 221, 222 are provided at portions excluding both ends of shaft members 226, 227 each constituting the central axis CL1 in the second direction Y. The rollers 221, 222 rotate together with the shaft members 226, 227. Each of the rollers 221, 222 is disposed such that a holding line L1, which is formed on the sheet 100 when the sheet 100 is held, is substantially parallel to the cutting line L2. The holding line L1 constitutes a boundary line between each of the rollers 221, 222 and the sheet 100 in a state where the sheet 100 is nipped and held by the pair of rollers 221, 222.

Figure 5:
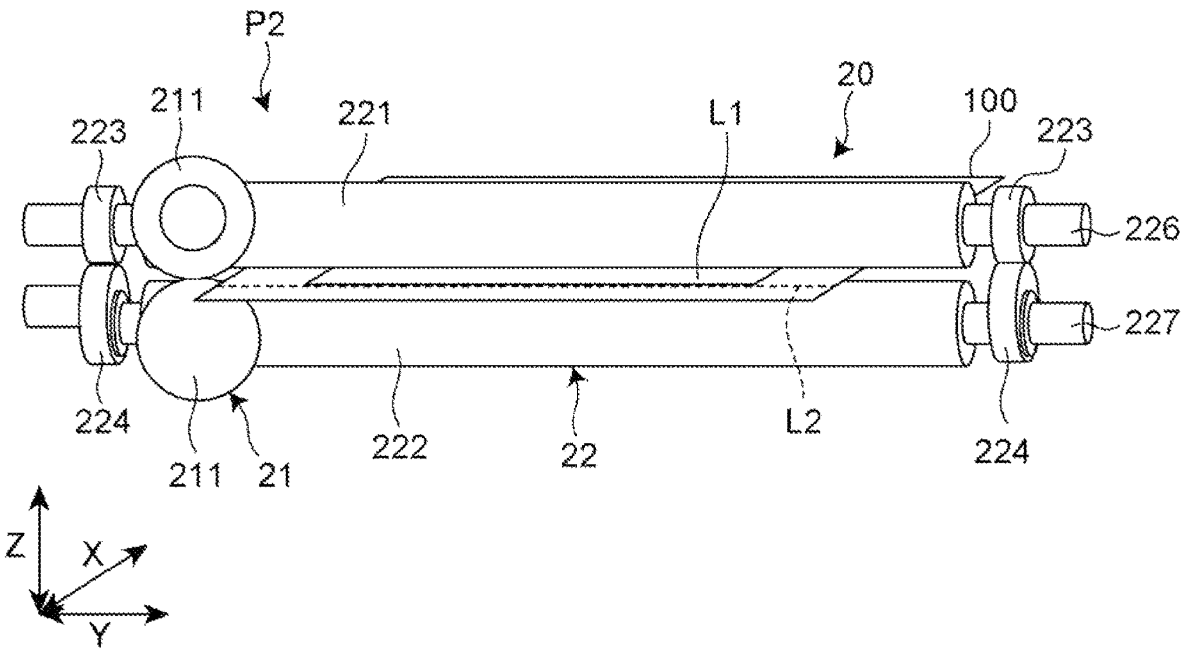
FIG. 5 is a schematic perspective view illustrating the processing unit at a release position of the sheet processing apparatus of FIG. 1.

In the present embodiment, the roller 221 on the upper side in the third direction Z of the pair of rollers 221, 222 is configured to be movable in the third direction Z. Specifically, as shown in FIGS. 4 and 5, bearing members 223, 224 are provided at both ends of the shaft members 226, 227 in the second direction Y, respectively. The bearing member 223 of the shaft member 226 on the upper side has a substantially disk shape, and the bearing member 224 of the shaft member 227 on the lower side has a substantially elliptical shape. Outer peripheral surfaces of the bearing members 223, 224 are in contact with each other. When the bearing member 224 is rotated, the roller 221 on the upper side moves between the holding position P1 and the release position P2 via the bearing member 223. As a result, a distance between the pair of rollers 221, 222 in the third direction Z can be adjusted. That is, the roller 221 on the upper side is an example of a movable holding member configured to be capable of moving in the thickness direction of the sheet 100 to adjust the distance between the pair of rollers 221, 222. The roller 222 on the lower side and the bearing member 224 on the lower side may be configured to rotate together, or may be configured to individually and independently rotate. When the roller 222 on the lower side and the bearing member 224 on the lower side are configured to rotate together, the bearing member 224 can be rotated by, for example, configuring the roller 222 on the lower side to be rotatable with the second motor 26. When the roller 222 on the lower side and the bearing member 224 on the lower side are configured to individually and independently rotate, the bearing member 224 can be rotated by, for example, providing a motor (not shown) that rotates only the bearing member 224 on the lower side.

Figure 3:
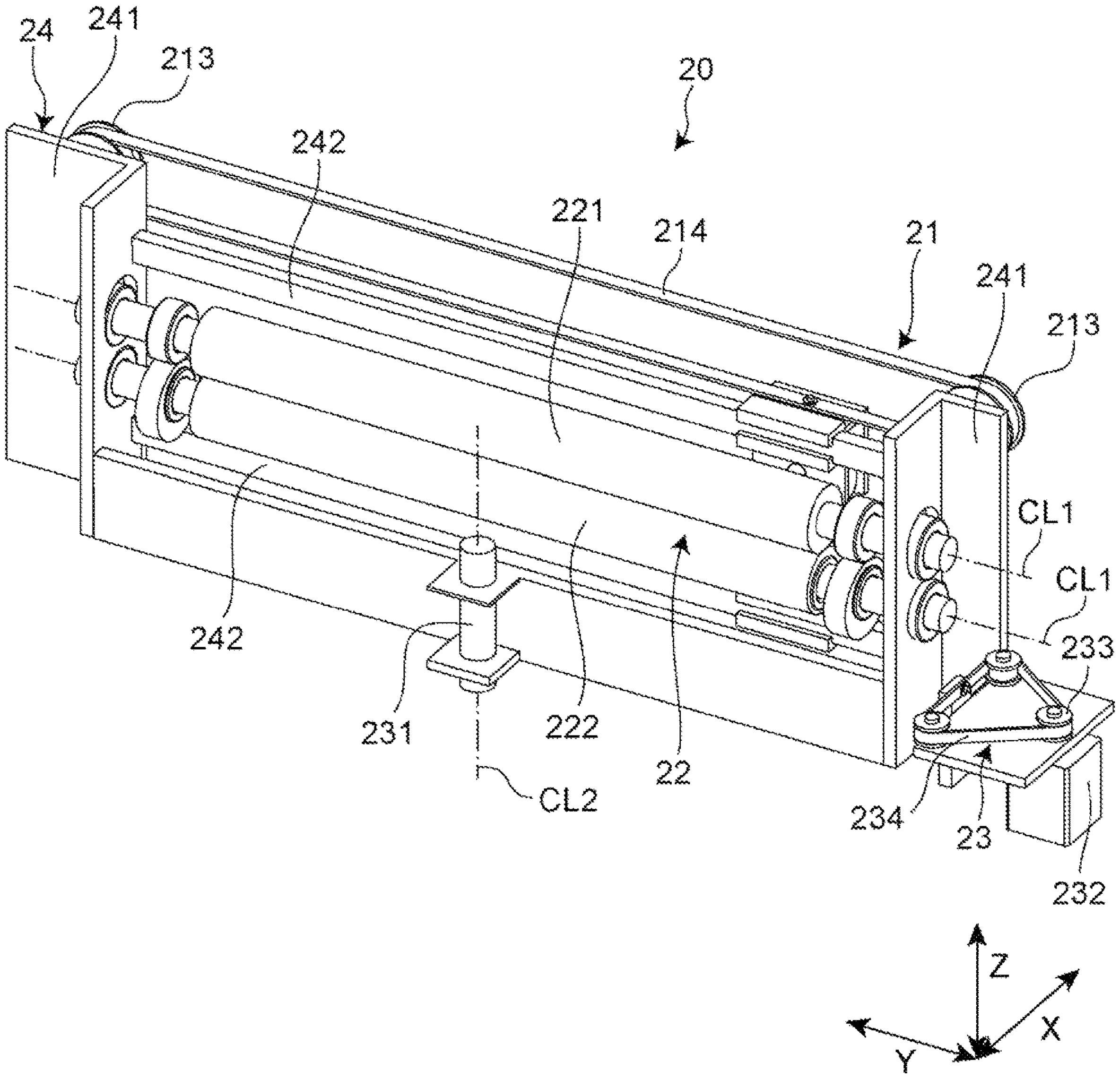
FIG. 3 is a perspective view illustrating the processing unit of the sheet processing apparatus of FIG. 1, as viewed from a different direction from that of FIG. 2.

The angle adjuster 23 is configured to be capable of adjusting the angle of the cutting unit 21 and the holding unit 22 with respect to the first direction X. Specifically, as shown in FIG. 3, the angle adjuster 23 includes a drive mechanism capable of integrally rotating the cutting unit 21 and the holding unit 22 about a rotation axis CL2 extending along the thickness direction of the sheet 100 (i.e., the third direction Z). The drive mechanism includes a rotation shaft portion 231 and a drive unit 232 connected to one of the pair of support wall portions 241. The rotation shaft portion 231 is provided substantially at the center of the support frame 24 to constitute the rotation axis CL2 in the second direction Y.

The drive unit 232 includes a plurality of pulleys 233, a belt member 234 wound around the plurality of pulleys 233, and a third motor 27 (see FIG. 6) that rotates any one of the plurality of pulleys 233. When driving the third motor 27 to rotate any one of the pulleys 233, the belt member 234 rotates around the plurality of pulleys 233, so that the support wall portion 241 to which the drive unit 232 is connected is moved in the first direction X. As a result, the support frame 24 rotates about the rotation axis CL2, so that the angle of the cutting unit 21 and the holding unit 22 with respect to the first direction X are adjusted.

The controller 30 includes, as an example, a CPU that performs calculations, a ROM and a RAM that store programs, data, or the like necessary for the operation of the sheet processing apparatus 1, and the like. In the present embodiment, as shown in FIG. 6, the controller 30 controls the conveyance device 12 of the conveyance unit 10 and the first motor 25, the second motor 26, and the third motor 27 of the processing unit 20, based on information input by a user via an operation unit 32 and information detected by a detection unit 31.

Figure 7:
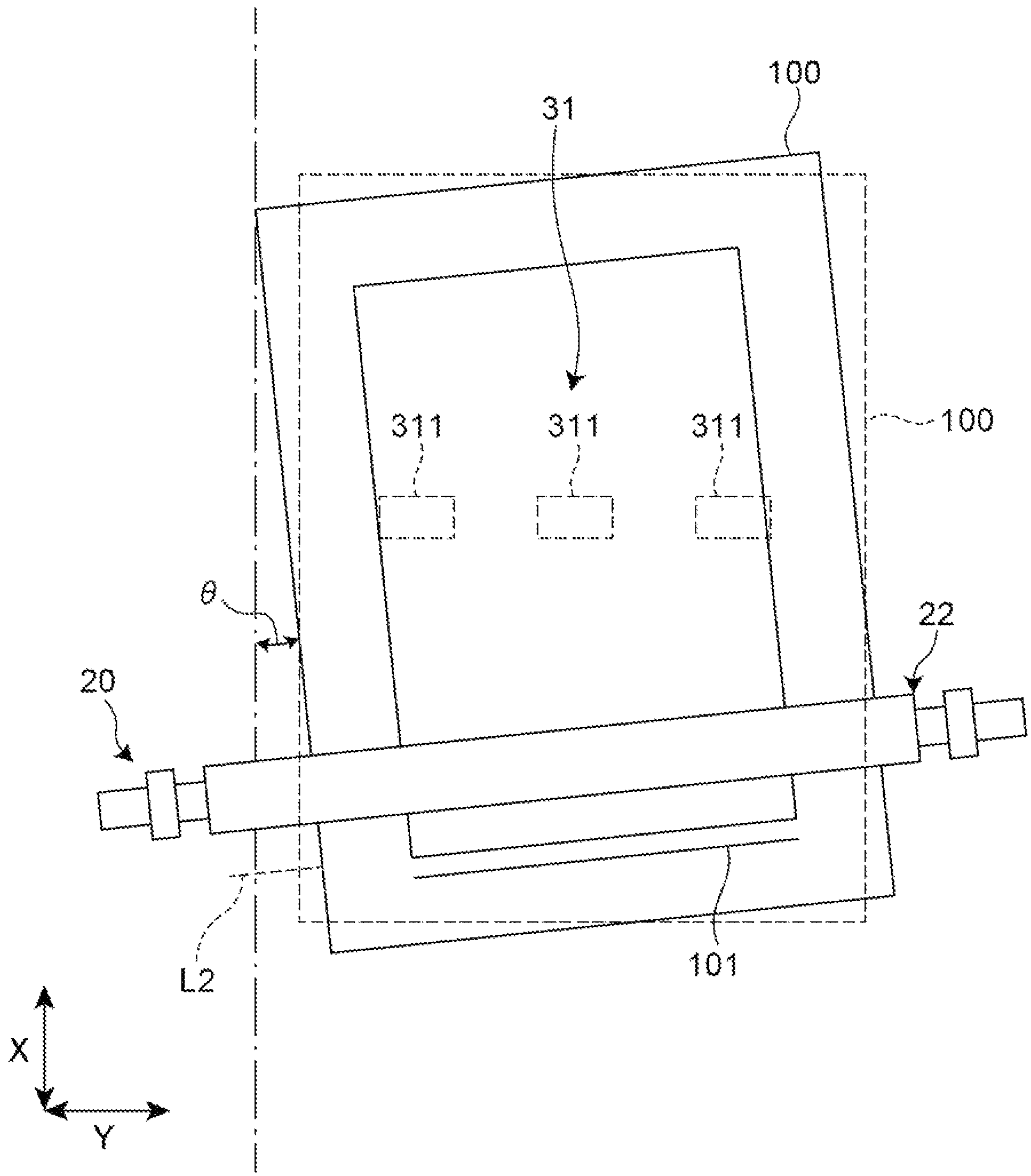
FIG. 7 is a schematic plan view illustrating a detection unit of the sheet processing apparatus of FIG. 1.

The detection unit 31 detects an angle θ of the sheet 100 with respect to the first direction X. Specifically, as shown in FIG. 7, the detection unit 31 includes a plurality of sensors 311 disposed side by side in the second direction Y. Each sensor 311 detects a line 101 for tilt detection provided downstream in the conveyance direction of the sheet 100 or a leading end of the sheet 100. The detection unit 31 detects the angle θ of the sheet 100 with respect to the first direction X from differences among timings when the line 101 or the leading end of the sheet 100 is detected by the respective sensors 311. The line 101 for tilt detection is disposed, for example, in parallel to one side of an image having a quadrangular outline, and is printed on the sheet 100 together with the image. As a result, not only when the sheet 100 itself is tilted with respect to the first direction X, but also when the sheet 100 itself is not tilted with respect to the first direction X but the image printed on the sheet 100 is tilted, the sheet 100 can be precisely cut at a cutting position set in accordance with the image.

For example, the controller 30 controls the second motor 26 to rotate one or both of the pair of rollers 221, 222 while the sheet 100 is being conveyed by the conveyance unit 10. This prevents occurrence of a jam due to contact of the sheet 100 with the pair of rollers 221, 222.

According to the sheet processing apparatus 1, the following effects can be exhibited.

In the sheet processing apparatus 1, the processing unit 20 includes the angle adjuster 23 capable of adjusting the angle of the cutting unit 21 and the holding unit 22 with respect to the first direction. With such a configuration, the sheet processing apparatus 1 capable of precisely cutting even the sheet 100 tilted with respect to the conveyance direction can be realized.

The angle adjuster 23 includes a drive mechanism capable of integrally rotating the cutting unit 21 and the holding unit 22 about a rotation axis extending along the thickness direction of the sheet 100. With such a configuration, the sheet processing apparatus 1 capable of precisely cutting even the sheet 100 tilted with respect to the conveyance direction can be easily realized.

The rotation axis CL2 is disposed in a middle of the holding unit 22 in the second direction. With such a configuration, the sheet processing apparatus 1 capable of more precisely cutting the sheet 100 tilted with respect to the conveyance direction can be realized.

The sheet processing apparatus 1 further includes the detection unit 31 that detects the angle θ of the sheet 100 with respect to the first direction. The controller 30 controls the angle adjuster 23 in accordance with a detection result of the detection unit 31 to adjust an angle θ of the cutting unit 21 and the holding unit 22 with respect to the first direction. With such a configuration, the sheet 100 can be precisely cut in accordance with a conveyed state.

The cutting unit 21 is disposed near the holding unit 22. With such a configuration, the sheet 100 is held near a cutting position, so that the cutting position can be prevented from being shifted due to sagging of the sheet 100 or the like. As a result, the sheet 100 can be more precisely cut.

The holding unit 22 includes the pair of rollers 221, 222 as a pair of holding members extending in the second direction and disposed in the thickness direction of the sheet 100. The pair of rollers 221, 222 include the roller 221 as the movable holding member configured to be capable of moving in the thickness direction of the sheet 100 to adjust the distance between the pair of rollers 221, 222. With such a configuration, the holding unit 22 serves as a guide when the sheet 100 is conveyed by adjusting the distance between the pair of rollers 221, 222 in accordance with the thickness of the sheet 100, so that the sheet 100 can be more precisely conveyed. In addition, the sheet 100 can be more precisely conveyed to the cutting position thereof.

The processing unit 20 further includes the second motor 26 that rotates the rollers 221, 222. The controller 30 controls the second motor 26 to rotate the rollers 221, 222 while the conveyance unit 10 is conveying the sheet 100. Such a configuration can prevent occurrence of a jam due to contact of the sheet 100 with the holding unit 22. In addition, the conveyance of the sheet 100 can be assisted by rotating the rollers 221, 222 during the conveyance of the sheet 100. As a result, the conveyance precision of the sheet 100 can be kept high, so that the sheet 100 can be more precisely cut.

The rollers 221, 222 are configured to be capable of rotating forward and backward. With such a configuration, for example, a margin of the sheet 100 after being cut can be dropped to an arbitrary side of the upstream and downstream of the rollers 221, 222. As a result, freedom in a layout of the sheet processing apparatus 1 can be increased.

The cutting unit 21 is disposed downstream of the holding unit 22 in the first direction. With such a configuration, the margin of the sheet 100 on the downstream side of the cutting position in the first direction X can be reduced, so that the sheet 100 can be used without waste.

The sheet processing apparatus 1 can also be configured as follows.

The cutting unit 21 may be disposed upstream of the holding unit 22 in the first direction X without being limited to the downstream of the holding unit 22 in the first direction X. With such a configuration, the margin of the sheet 100 on the upstream side of the cutting position in the first direction X can be reduced, so that the sheet 100 can be used without waste.

Figure 8:
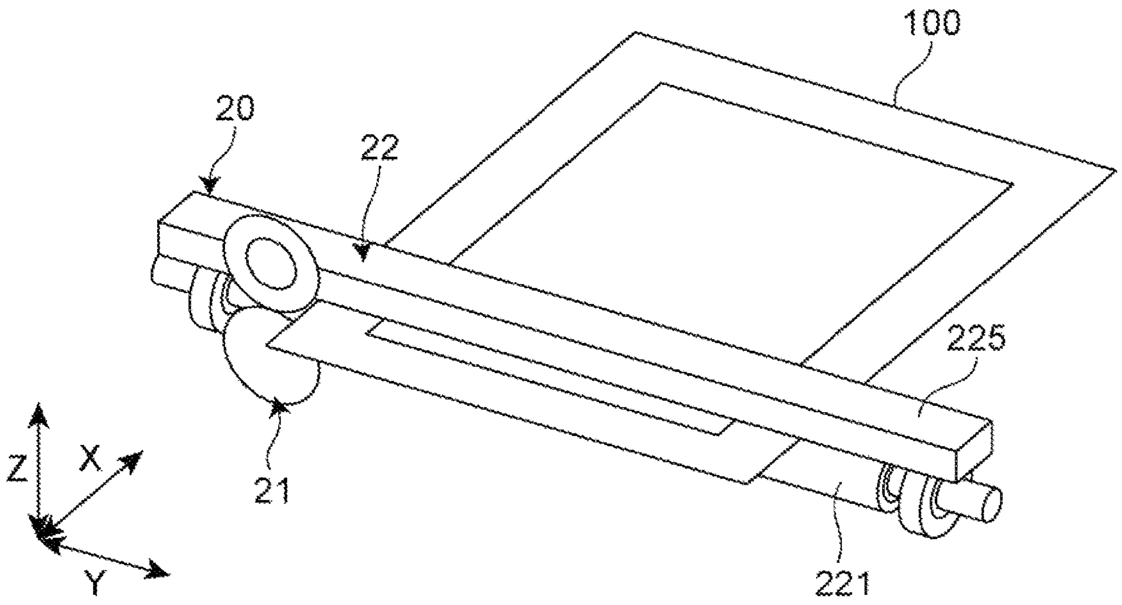
FIG. 8 is a schematic perspective view illustrating a first modification of the sheet processing apparatus of FIG. 1.

The holding unit 22 is not limited to the case of being configured by the pair of rollers 221, 222. For example, as shown in FIG. 8, the holding unit 22 may be configured by one roller 221 and one non-rotating member 225. In the holding unit 22 of FIG. 8, the non-rotating member 225 has a substantially rectangular plate shape, but any other shape may be adopted. In addition, although not shown, the holding unit 22 may be configured by a pair of non-rotating members.

Figure 9:
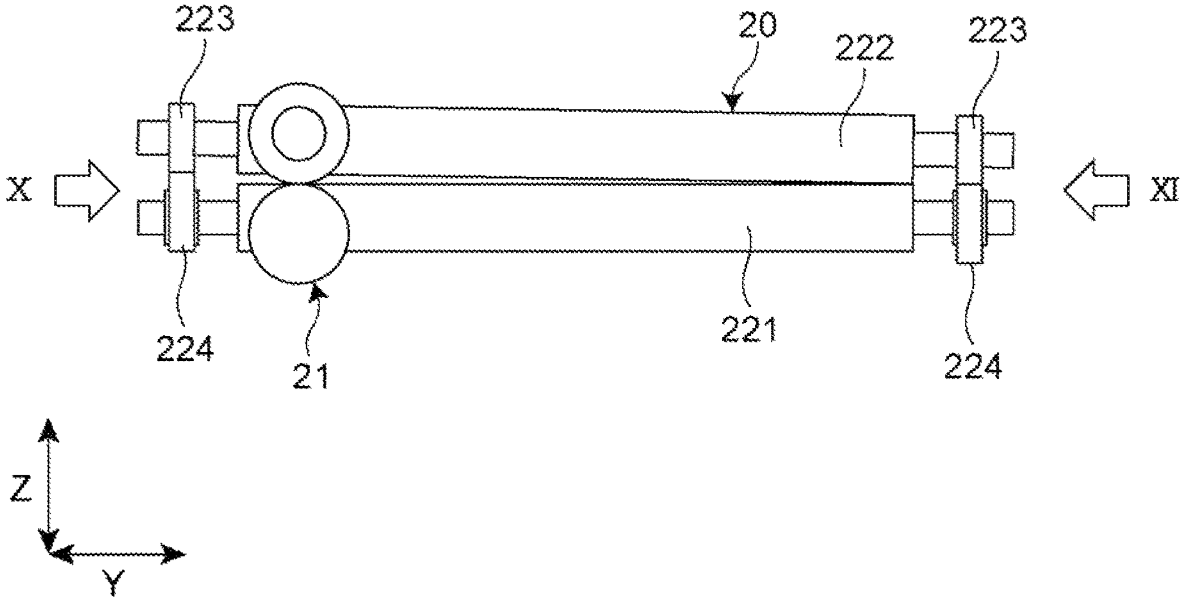
FIG. 9 is a schematic front view illustrating a second modification of the sheet processing apparatus of FIG. 1.
Figure 10:
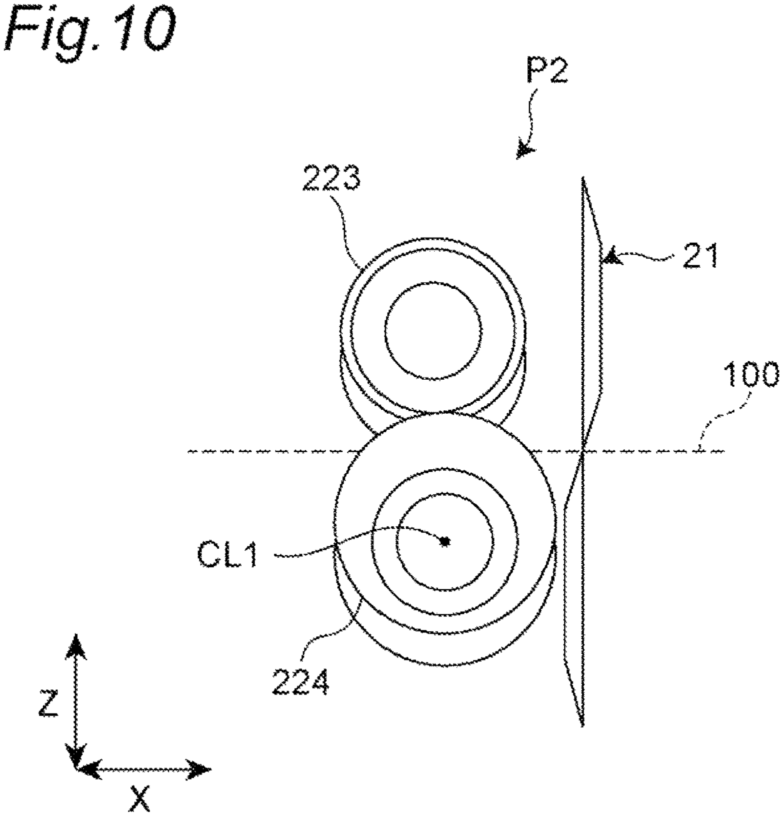
FIG. 10 is an X arrow view of FIG. 9.
Figure 11:
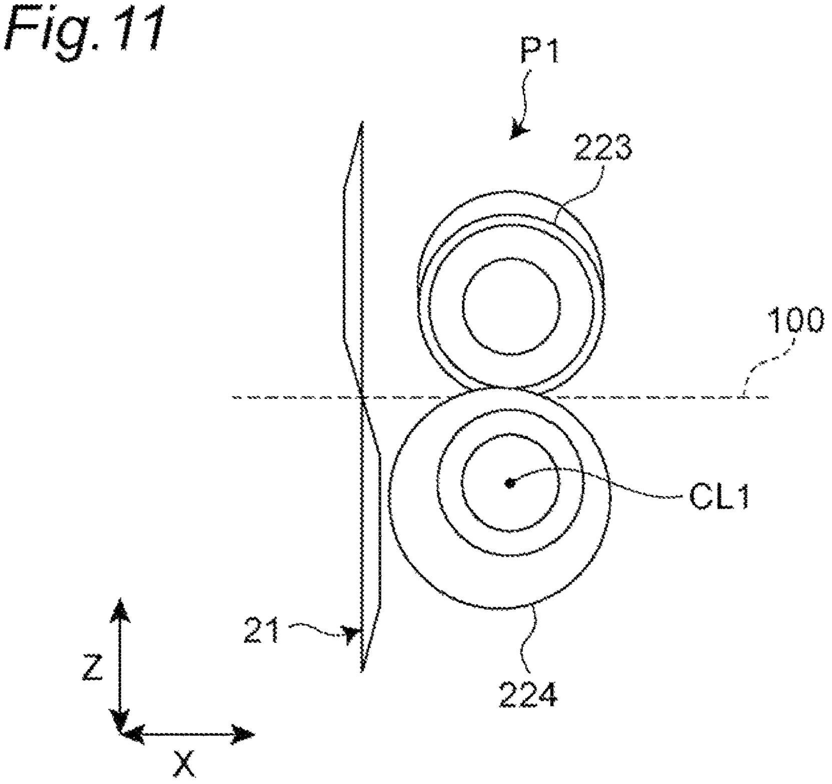
FIG. 11 is an XI arrow view of FIG. 9.

For example, as shown in FIG. 9, the pair of rollers 221, 222 may be configured capable of independently adjusting the distance at one end in the second direction Y of the pair of holding members 221, 222 and the distance at the other end in the second direction Y of the pair of holding members 221, 222. In the pair of rollers 221, 222 of FIG. 9, as shown in FIGS. 10 and 11, the roller 222 on the lower side includes the bearing member 224 having different positions of major and minor diameters when viewed along the second direction Y. With such a configuration, for example, one end of the roller 221 on the upper side (e.g., end on the right side of FIG. 9) can be positioned at the holding position P1 while the other end of the roller 221 on the upper side (e.g., end on the left side of FIG. 9) is being positioned at the release position P2. As a result, the sheet 100 can be rotated around a portion of the sheet 100 that the roller 221 on the upper side is brought into contact with to correct the sheet 100 tilted with respect to the conveyance direction.

Figure 12:
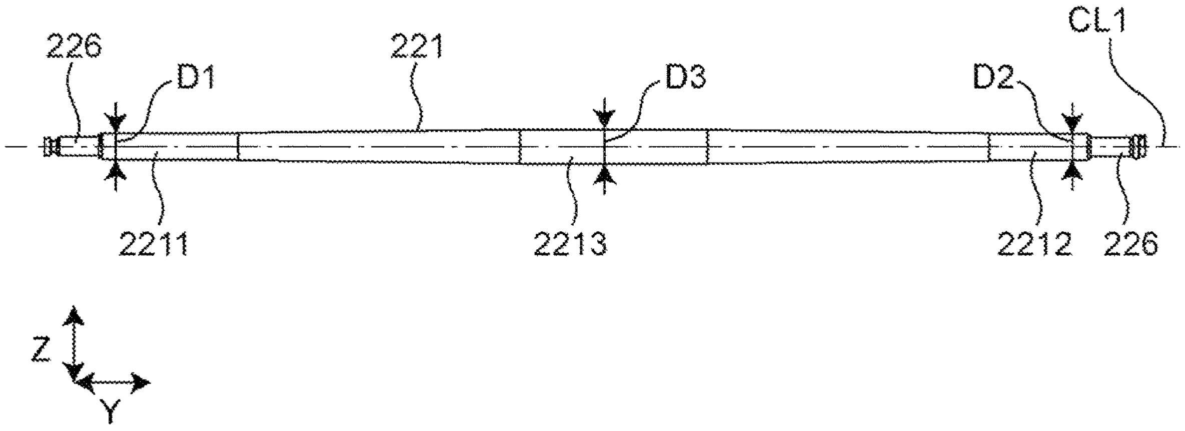
FIG. 12 is a schematic perspective view illustrating a third modification of the sheet processing apparatus of FIG. 1.

For example, each of the rollers 221, 222 can be configured as shown in FIG. 12. FIG. 12 shows only the roller 221. The roller 221 of FIG. 12 has a drum shape and includes a first end portion 2211, a second end portion 2212, and a middle portion 2213. The first end portion 2211 constitutes one end of the roller 221 in the second direction Y. The second end portion 2212 is located on an opposite side to the first end portion 2211 in the second direction Y, and constitutes the other end of the roller 221 in the second direction Y. The middle portion 2213 is located in the middle between the first end portion 2211 and the second end portion 2212 in the second direction Y. The middle portion 2213 has a dimension D3 in a radial direction with respect to a central axis CL1 (hereinafter, referred to as a radial direction) that is more than a dimension D1 in the radial direction of the first end portion 2211 and a dimension D2 in the radial direction of the second end portion 2212. The roller of FIG. 12 is configured such that the dimension in the radial direction increases as going from the first end portion 2211 toward the middle portion 2213 along the second direction Y, and the dimension in the radial direction decreases as going from the middle portion 2213 toward the second end portion 2212 along the second direction Y. With such a configuration, pressure is uniformly applied to the sheet 100 from the rollers 221, 222 over the second direction Y, so that the sheet 100 can be uniformly held in the second direction Y. As a result, the sheet 100 can be stably cut, and the sheet 100 can be stably conveyed. Both of the pair of rollers 221, 222 may be configured as shown in FIG. 12, or only one of the pair of rollers 221, 222 may be configured as shown in FIG. 12.

A first one-way clutch (not shown) can be provided between the shaft member 227 and the bearing member 224 and a second one-way clutch (not shown) can be provided between the shaft member 227 and the roller 222. A drive transmission direction of the first clutch and a drive transmission direction of the second clutch are reversed each other. In this case, when the shaft member 227 is rotated in a predetermined direction, only the roller 222 rotates, and when the shaft member 227 is rotated in a direction opposite to the predetermined direction, only the bearing member 224 rotates and the roller 221 on the upper side moves between the holding position P1 and the release position P2. With such a configuration, when the holding unit 22 is at the holding position P1, the roller 222 can be rotated while positioning the holding unit 22 at the holding position P1 when the second motor 26 is rotated in the predetermined direction, and the holding unit 22 can be moved to the release position P2 when the second motor 26 is rotated in the direction opposite to the predetermined direction. That is, the processing unit 20 includes a moving mechanism that, when the holding unit 22 is at the holding position P1, rotates the roller 222 by rotating the second motor 26 in the predetermined direction while positioning the holding unit 22 at the holding position P1, and moves the holding unit 22 to the release position P2 by rotating the second motor 26 in the direction opposite to the predetermined direction. In the present embodiment, the shaft member 227, the bearing member 224, the roller 222, and the one-way clutches constitute the moving mechanism.

The angle adjuster 23 is not limited to the above embodiment, and may adopt any configuration capable of adjusting the angle θ of the cutting unit 21 and the holding unit 22 with respect to the first direction. For example, the rotation shaft portion 231 is not limited to being provided at substantially the center of the support frame 24 in the second direction Y, but may be provided at one end of the support frame 24 in the second direction Y.

By appropriately combining arbitrary embodiments or modifications among the various embodiments or modifications, it is possible to exhibit the respective effects. In addition, combinations of embodiments, combinations of examples, or combinations of embodiments and examples are possible, and combinations of features in different embodiments or examples are also possible.

The present invention can provide a sheet processing apparatus capable of precisely cutting even a sheet tilted with respect to a conveyance direction, and thus has a great industrial use value.

REFERENCE SIGNS LIST

1. sheet processing apparatus
10. conveyance unit
11. sheet feed table
12. conveyance device
13. discharge tray
20. processing unit
21. cutting unit
211. cutting blade
212. moving device
213. pulley
214. belt member
22. holding unit
221, 222. roller
223, 224. bearing member
225. non-rotating member
226, 227. shaft member
23. angle adjuster
231. rotation shaft portion
232. drive unit
233. pulley
234. belt member
24. support frame
241. support wall portion
242. rail member
25. first motor
26. second motor
27. third motor
30. controller
31. detection unit
311. sensor
32. operation unit
100. sheet
101. line

The invention claimed is:

1. A sheet processing apparatus comprising:
a conveyance unit that conveys a sheet along a first direction;
a processing unit that performs processing on the sheet conveyed by the conveyance unit; and
a controller configured to control the conveyance unit and the processing unit, wherein
the processing unit includes:
a cutting unit capable of cutting the sheet along a cutting line extending in a second direction intersecting with the first direction;
a holding unit that is configured to be movable between a holding position at which the sheet is held by being sandwiched in a thickness direction of the sheet and a release position at which holding of the sheet is released, and that is disposed such that a holding line, which is formed on the sheet when the sheet is held, is substantially parallel to the cutting line; and an angle adjuster capable of adjusting an angle of the cutting unit and the holding unit with respect to the first direction, and the angle adjuster includes a drive mechanism capable of integrally rotating the cutting unit and the holding unit about a rotation axis extending along the thickness direction of the sheet.

2. The sheet processing apparatus according to claim 1, wherein the rotation axis is disposed in a middle of the holding unit in the second direction.

3. A sheet processing apparatus comprising:

a conveyance unit that conveys a sheet along a first direction;

a processing unit that performs processing on the sheet conveyed by the conveyance unit; and a controller configured to control the conveyance unit and the processing unit, wherein the processing unit includes:

a cutting unit capable of cutting the sheet along a cutting line extending in a second direction intersecting with the first direction;

a holding unit that is configured to be movable between a holding position at which the sheet is held by being sandwiched in a thickness direction of the sheet and a release position at which holding of the sheet is released, and that is disposed such that a holding line, which is formed on the sheet when the sheet is held, is substantially parallel to the cutting line; and an angle adjuster capable of adjusting an angle of the cutting unit and the holding unit with respect to the first direction, the sheet processing apparatus comprises a detection unit configured to detect an angle of the sheet with respect to the first direction, and the controller is configured to control the angle adjuster in accordance with a detection result of the detection unit to adjust an angle of the cutting unit and the holding unit with respect to the first direction.

4. A sheet processing apparatus comprising:

a conveyance unit that conveys a sheet along a first direction;

a processing unit that performs processing on the sheet conveyed by the conveyance unit; and a controller configured to control the conveyance unit and the processing unit, wherein the processing unit includes:

a cutting unit capable of cutting the sheet along a cutting line extending in a second direction intersecting with the first direction;

a holding unit that is configured to be movable between a holding position at which the sheet is held by being sandwiched in a thickness direction of the sheet when the sheet is cut and a release position at which holding of the sheet is released, and that is disposed such that a holding line, which is formed on the sheet when the sheet is held, is substantially parallel to the cutting line; and an angle adjuster capable of adjusting an angle of the cutting unit and the holding unit with respect to the first direction, the holding unit includes a pair of holding members each extending in the second direction and disposed in the thickness direction of the sheet, the pair of holding members include a movable holding member configured to be capable of moving in the thickness direction of the sheet to adjust a distance between the pair of holding members, and the pair of holding members are configured to be capable of independently adjusting a distance at one end in the second direction of the pair of holding members and a distance at an other end in the second direction of the pair of holding members.

5. A sheet processing apparatus comprising:

a conveyance unit that conveys a sheet along a first direction;

a processing unit that performs processing on the sheet conveyed by the conveyance unit; and a controller configured to control the conveyance unit and the processing unit, wherein the processing unit includes:

a cutting unit capable of cutting the sheet along a cutting line extending in a second direction intersecting with the first direction;

a holding unit that is configured to be movable between a holding position at which the sheet is held by being sandwiched in a thickness direction of the sheet when the sheet is cut and a release position at which holding of the sheet is released, and that is disposed such that a holding line, which is formed on the sheet when the sheet is held, is substantially parallel to the cutting line; and an angle adjuster capable of adjusting an angle of the cutting unit and the holding unit with respect to the first direction, the holding unit includes a pair of holding members each extending in the second direction and disposed in the thickness direction of the sheet, the pair of holding members include a movable holding member configured to be capable of moving in the thickness direction of the sheet to adjust a distance between the pair of holding members, and at least one of the pair of holding members is configured by a roller including a central axis extending along the second direction, the roller being rotatable about the central axis, the processing unit further includes a drive device that rotates the roller, and the controller controls the drive device to rotate the roller while the sheet is being conveyed by the conveyance unit.

6. The sheet processing apparatus according to claim 5, wherein the roller is configured to be rotatable forward and backward.

7. The sheet processing apparatus according to claim 5, wherein the drive device is configured by a motor, and the processing unit includes a moving mechanism that, when the holding unit is at the holding position, rotates the roller while positioning the holding unit at the holding position when the motor is rotated in a predetermined direction, and moves the holding unit to the release position when the motor is rotated in a direction opposite to the predetermined direction.

8. The sheet processing apparatus according to claim 5, wherein the roller includes a first end portion in the second direction, a second end portion located on a side opposite to the first end portion in the second direction, and a middle portion located between the first end portion and the second end portion in the second direction, and the roller is configured such that a dimension in a radial dimension with respect to the central axis increases as going from the first end portion toward the middle portion along the second direction, and a dimension in the radial direction decreases as going from the middle portion toward the second end portion along the second direction.

* * * * *